(12) United States Patent
Yamada et al.

(10) Patent No.: US 7,097,938 B2
(45) Date of Patent: Aug. 29, 2006

(54) NEGATIVE ELECTRODE MATERIAL AND BATTERY USING THE SAME

(75) Inventors: Shinichiro Yamada, Kanagawa (JP); Hiroshi Inoue, Kanagawa (JP); Takuya Endo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/171,117

(22) Filed: Jun. 13, 2002

(65) Prior Publication Data

US 2003/0013018 A1    Jan. 16, 2003

(30) Foreign Application Priority Data

Jun. 27, 2001    (JP)    ............ P2001-195104

(51) Int. Cl.
*H01M 2/12* (2006.01)
*H01M 4/58* (2006.01)
*H01M 6/04* (2006.01)
*H01M 10/26* (2006.01)

(52) U.S. Cl. .......... 429/231.6; 429/225; 429/224; 429/220; 429/231.4; 429/229

(58) Field of Classification Search ........ 429/231.6, 429/225, 224, 220, 229, 231.4, 53, 206, 218.3
See application file for complete search history.

(56) References Cited

U.S. PATENT DOCUMENTS

| | | |
|---|---|---|
| 4,631,172 A | 12/1986 | Yamamoto et al. |
| 4,950,566 A | 8/1990 | Huggins et al. |
| 5,731,098 A * | 3/1998 | Suzuki ............. 429/53 |
| 5,962,165 A * | 10/1999 | Tsuruta et al. ........ 429/218.2 |

FOREIGN PATENT DOCUMENTS

| | | |
|---|---|---|
| CH | 679437 | 2/1992 |
| EP | 0323888 | 7/1989 |
| EP | 0 880 187 A2 * | 11/1998 |
| EP | 1096583 | 5/2001 |
| GB | 1045321 | 10/1966 |

OTHER PUBLICATIONS

Dascoulidou et al. ("Preparation, structure, and magnetic properties of the alkaline earth manganese compounds AMnX with A= Mg, Ca, Sr, Ba and X= Si, Ge, Sn", Zeitschrift fuer Anorganische und Allgemeine Chemie (1998), 624 (1), 119-123, no month.*
CAPLUS English Abstract for Dascoulidou et al. , Zeitschrift fuer Anorganische und Allgemeine Chemie (1998), 624 (1), 119-123, no month available.*

* cited by examiner

*Primary Examiner*—Patrick Joseph Ryan
*Assistant Examiner*—Shermanda L. Williams
(74) *Attorney, Agent, or Firm*—Sonnenschein Nath & Rosenthal LLP

(57) ABSTRACT

A negative electrode material and a battery which have an excellent cycle characteristic as well as a high capacity are provided. A positive electrode housed in an exterior can and a negative electrode housed in an exterior cup are laminated with a separator therebetween. An electrolytic solution of lithium salt dissolved in a solvent is poured into the inside of both the exterior can and the exterior cup. The negative electrode contains $Mg_{2-x}MII_xMI$. MI expresses a first element such as Si, Sn, Ge, Pb, or the like. MII expresses a second element which is a metallic element, preferably Mn, Cu, Zn, or the like except both Mg and the first element. X is preferably in the range of $0.1 \leq x \leq 1.9$. Substituting part of Mg by the second element MII can produce the distortion of the crystal structure, ease distortion accompanying the occluding/releasing lithium, and improve the charge and discharge efficiency and the cycle characteristic.

6 Claims, 3 Drawing Sheets

NEGATIVE ELECTRODE MATERIAL AND BATTERY USING THE SAME

BACKGROUND OF THE INVENTION

1. Field of the Invention

The present invention relates to a negative electrode material containing a magnesium compound and a battery using the same.

2. Description of the Related Art

With progress of electronic engineering in recent years, many small portable electric devices, such as video cameras combined with video tape recorder, cellular phones, and laptop computers, become widely used, and the miniaturization and the weight saving thereof are attempted. Then, as a portable power supply used for these devices, development of small and lightweight secondary batteries with a high energy density is required strongly. As a secondary battery which theoretically has a high energy density and can generate a high voltage, batteries using a light metal such as a lithium metal, a sodium metal, or an aluminum metal as a negative active material are known, and the practical application thereof is expected. Especially, a lithium secondary battery using a lithium metal as a negative active material has excellent handling and can achieve high output power and a high energy density. Therefore research and development has actively been done.

However, if the above light metal such as the lithium metal is directly used as a negative electrode material, the light metal will easily precipitate into a dendrite on the negative electrode in a charging process, and the current density become very high at the tip of the dendrite. Because of this, the cycle life decreases due to the degradation of electrolytes and the like, and the dendrites grow excessively which results in electric short-circuit in the battery. Then, in order to prevent such precipitation of the metal in the dendrite, instead of directly using the lithium metal for the negative electrode, a graphite material utilized for the intercalation reaction of the lithium ions between graphite layers, or a carbonaceous material applied to the occluding/releasing action of the lithium ions inside pores is used.

However, with the graphite material utilized for the intercalation reaction, the negative electrode capacity has an upper limit as specified in the composition $C_6Li$ of the first stage graphite intercalation compound. Moreover, although the carbonaceous material applied to the occluding/releasing action inside the pores has not such a theoretical upper limit, it is industrially difficult to control such a minute pore structure, and the increase in number of the pores can cause the reduction of the specific gravity of the carbonaceous material, and the carbonaceous material cannot serve as an effective mean of improvement in the negative electrode capacity per unit volume. For such a reason, it is difficult for the conventional carbonaceous materials to adapt to electric devices for longer time utilization and higher energy density of the power supply thereof in the future, and it is desired to develop the negative electrode material which is excellent in the occluding/releasing capability of lithium ions.

As other negative electrode materials, the magnesium silicide ($Mg_2Si$), tin-magnesium intermetallic compound ($Mg_2Sn$), germanium-magnesium intermetallic compound ($Mg_2Ge$), and lead-magnesium intermetallic compound ($Mg_2Pb$), which have reverse fluorite structure, are known, for example. However, these compounds have the problem that the cycle characteristic as the negative electrode is low (H. Sakaguchi, H. Honda and T. Esaka, J.Power Sources, 81–82, 224 (1999)).

SUMMARY OF THE INVENTION

The present invention has been achieved in view of the above problems. It is an object of the invention to provide a negative electrode material which has a high capacity and also an excellent cycle characteristic thereof, and a battery using the same.

A negative electrode material according to the present invention contains a compound containing magnesium (Mg), a first element of at least one element selected from the group consisting of silicon (Si), tin (Sn), germanium (Ge), and lead (Pb), and a second element of at least one element selected from metallic elements except both magnesium and the first element.

A battery according to the present invention comprises an electrolyte with a positive electrode and a negative electrode, wherein the negative electrode material contains a compound containing magnesium, a first element of at least one element selected from the group consisting of silicon, tin, germanium, and lead, and a second element of at least one element selected from metallic elements except both magnesium and the first element.

In the negative electrode material according to the present invention, the second element in addition to magnesium and the first element is included, thus, distortion arises in the crystal structure, the electrode reaction easily occurs, and the capacity and the cycle characteristic is improved.

In the battery according to the present invention, since the negative electrode material of the invention is used, the excellent charge and discharge properties are obtained.

Other and further objects, features and advantages of the invention will appear more fully from the following description.

DETAILED DESCRIPTION OF THE PREFERRED EMBODIMENTS

Figure 1:
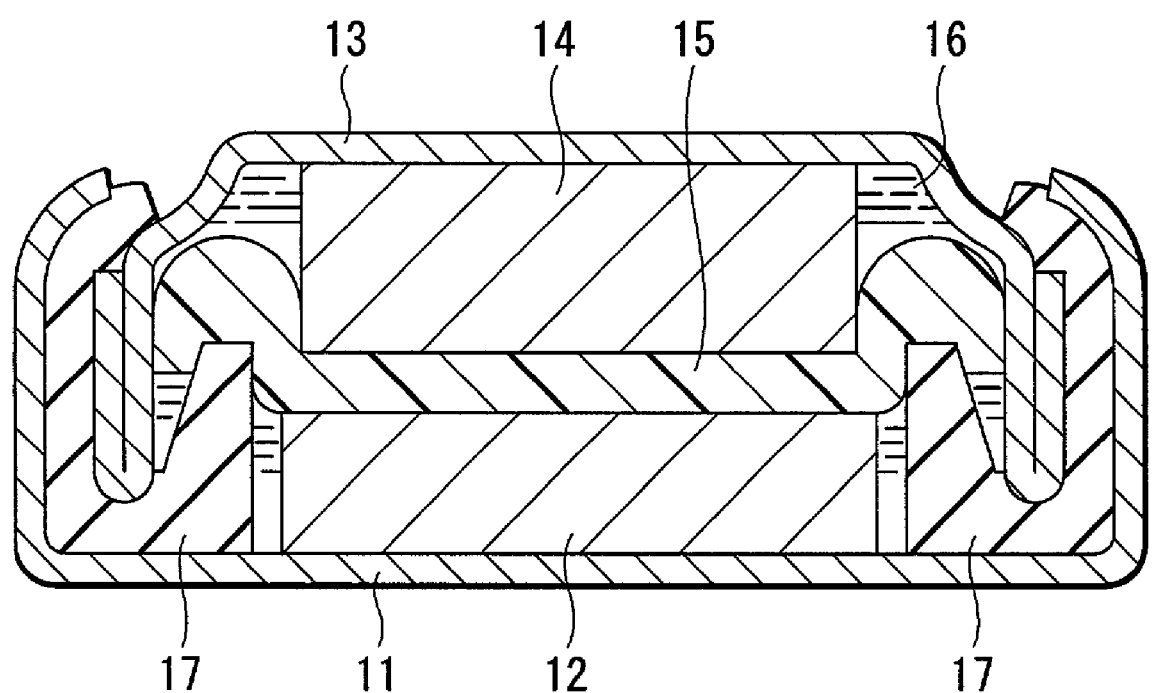
FIG. 1 is a sectional view showing the configuration of a secondary battery using a negative electrode material according to a embodiment of the invention.

Embodiments of the present invention will be described in detail below with reference to accompanying drawings.

A negative electrode material according to an embodiment of the invention contains a compound containing magnesium, a first element of at least one element selected from the group consisting of silicon, tin, germanium and lead, and a second element of at least one element selected from metallic elements except both magnesium and the first element. The compound can occlude and release lithium ions, and, for example, is expressed by a chemical formula shown in chemical formula 1.

[chemical formula 1]

wherein MI expresses the first element, MII expresses the second element, and x is in a range of 0<x<2. The composition of the first element may be obtained in stoichiometry or not.

That is, the compound can be obtained by substituting part of magnesium of $Mg_2MI$ having the reverse fluorite structure by the second element MII. Therefore, the distortion of the reverse fluorite structure arises in the compound, which allows the distortion of the crystal structure accompanying the occluding/releasing lithium or the like to be eased, and therefore the electrode reaction can easily occur, and the improvement of the charge and discharge efficiency and of the cycle characteristic can be achieved.

The second element requires to be substituted by magnesium from the point of view of an ionic radius and the number of ionization, and, for example, preferably contains at least one element selected from the group consisting of manganese (Mn), copper (Cu), and zinc (Zn), because, in such a case, the excellent cycle characteristic can be obtained. The composition ratio of the second element to magnesium ((the second element)/(magnesium)) is preferably in a range of 0.1/1.9 to 1.9/0.1 inclusive in mol ratio, more preferably in a range of 0.5 to 1.7 inclusive. Moreover, when the composition ratio is expressed, for example, by x in the chemical formula 1, x is preferably in a range of $0.1 \leq x \leq 1.9$, more preferably in a range of $0.5 \leq x \leq 1.7$, because in the above ranges more excellent battery properties can be obtained.

Such a compound can include $Mg_{2-x}MII_xSi$, $Mg_{2-x}MI_xSn$, $Mg_{2-x}MII_xGe$, $Mg_{2-x}MII_xPb$ or the like, and, more specifically, $Mg_{1.5}Mn0.5Sn$, $Mg_{1.0}Mn_{1.0}Sn$, $Mg_{0.5}Mn_{1.5}Sn$, $Mg_{1.5}Mn_{0.5}Si$, $Mg_{1.0}Mn_{1.0}Si$, $Mg_{0.5}Mn_{1.5}Si$, or the like. Although not illustrated here, the first element or the second element may be composed of two or more kinds of elements. In addition, the crystallinity or the structure of the compound is not limited.

The compound can be manufactured by various methods, and for example, can be obtained by mixing materials of magnesium, the first element, and the second element, fusing the mixture with an electric furnace, a high frequency induction heating furnace, an arc melting furnace, or the like, and then solidifying the mixture. In addition, for the amorphization, it is necessary to solidify with the rapid quenching, and the method thereof can include various atomizing processes, such as gas atomizing or water atomizing, various roll methods such as the twin roll process, or the spray method, for example.

The compound can also be manufactured by the mechanical alloying method using solid diffusion, the vacuum deposition, or the like. However, since magnesium is a substance with high reactivity to water, cautions are required in using the substance.

The negative electrode material preferably contains a carbonaceous material in addition to such a compound. The carbonaceous material can provide the improvement of the conductivity, occlude and release lithium or the like, and functions not only as the negative active material but also as a conductive agent, so the capacity can be improved more, and furthermore, the cycle characteristic is also excellent. The carbonaceous material can include for example, a non-graphitizing carbon material, a graphitizing carbon material, or graphite.

The negative electrode material can be used for the negative electrode of the following secondary battery, for example.

FIG. 1 shows a sectional structure of a secondary battery using the negative electrode material according to the embodiment. The secondary battery is a so-called coin type and has a structure where a disk-like positive electrode 12 housed in an exterior can 11, and a disk-like negative electrode 14 housed in an exterior cup 13 are laminated with a separator 15 disposed therebetween. The inside of both the exterior can 11 and the exterior cup 13 is filled with an electrolytic solution 16 which is a liquid electrolyte, and a periphery area of both the exterior can 11 and the exterior cup 13 is sealed by caulking via an insulating gasket 17.

Each of the exterior can 11 and the exterior cup 13 is composed of, for example, a metal such as stainless steel or aluminum. The exterior can 11 functions as a charge collector of the positive electrode 12, and the exterior cup 13 functions as a charge collector of the negative electrode 14.

For example, the positive electrode 12 contains the positive electrode material which can occlude and release lithium, as a positive active material, and may be composed to contain a conductive agent such as carbon black or graphite and a binder such as polyvinylidene fluoride. In addition, when using the negative electrode material according to the embodiment for the negative electrode 14, it is desirable that the positive electrode 12 contains sufficient lithium. For example, the lithium-metal composite oxide expressed by a general formula $Li_xMO_2$ or the interlayer compound containing lithium is preferred as the positive electrode material which satisfies such conditions. In the formula, M is at least one element selected from the group consisting of cobalt (Co), nickel (Ni), and manganese, and x is in a range of 0<x<1. Especially, $LiCoO_2$ is particularly desirable because $LiCoO_2$ can provide the excellent properties.

The lithium-metal composite oxide can be obtained, for example, by grinding and mixing lithium carbonate, lithium nitrate, lithium oxide or lithium hydroxide, and at least one element selected from the group consisting of carbonates, nitrates, oxides and hydroxides of cobalt, nickel, manganese, and the like, and firing the mixture thereof at the temperature range of 600–1000° C. under oxygen atmosphere.

Moreover, in order to achieve the high capacity, the positive electrode 12 should contain lithium corresponding to the charge and discharge capacity of 250 mAh or more per the negative electrode material under the steady state (for example, after repeating the charge and discharge about 5 times). The positive electrode 12 preferably contains lithium corresponding to the charge and discharge capacity of 300 mAh or more, more preferably 350 mAh or more. In addition, all lithium does not necessarily need to be supplied from the positive electrode material, and, that is, lithium corresponding to the charge and discharge capacity 250 mAh or more per the negative electrode material may exist in the system of the battery. The amount of lithium is estimated by measuring the discharge capacity of the battery.

The positive electrode 12 can be produced, for example, by mixing the positive electrode material, the conductive agent, and the binder to prepare a positive electrode mixture, and casting the positive electrode mixture into a pellet form with compression molding. Also, the positive electrode 12 may be produced by mixing the positive electrode material, the conductive agent, and the binder, plus a solvent such as formamide or N-methyl-pyrolidone, to prepare the positive electrode mixture, drying the positive electrode mixture, and casting the dried mixture with compression molding.

The negative electrode 14 contains the negative electrode material according to the embodiment. That is, the negative electrode 14 contains the compound containing the second element as the negative active material in addition to magnesium and the first element, and preferably the carbonaceous material as both the negative active material and the conductive agent. Moreover, if needed, the negative electrode 14 may be composed to further contain the conductive agent such as the carbonaceous material, the metal powder, or the conductive polymer, and a binding agent such as polyvinylidene fluoride.

The negative electrode 14 can be produced, for example, by mixing the negative electrode material, the conductive agent, and the binder to prepare a negative electrode mixture, and casting the negative electrode mixture into a pellet form with compression molding. Also, the negative electrode 14 may be produced by mixing the negative electrode material, the conductive agent, and the binder, plus a solvent such as formamide or N-methyl-pyrolidone, to prepare the negative electrode mixture, drying the negative electrode mixture, and casting the dried mixture with compression molding.

The separator 15 separates the positive electrode 12 and the negative electrode 14, prevents the short circuit of the current generated by the contact of both electrodes, and permits the passage of the lithium ions. The separator 15 may be composed of, for example, a porous film of a synthetic resin made of polytetrafluoroethylene, polypropylene, polyethylene, or the like, a porous film of an inorganic material such as a ceramic nonwoven fabric, or a laminate structure with two or more kinds of the above films.

The electrolytic solution 16 is obtained by dissolving a lithium salt as an electrolyte salt into a solvent, and shows ion conductivity when the lithium salt ionizes. As the lithium salt, $LiPF_6$, $LiClO_4$, $LiAsF_6$, $LiBF_4$, $LiB(C_6H_5)_4$, $LiCH_3SO_3$, $LiCF_3SO_3$, $LiCl$, $LiBr$, $LiN(CF_3SO_2)_2$, $LiC(CF_3$ or the like is suitable, and one or more kinds among them are mixed and used.

As the solvent, a nonaqueous solvent such as propylene carbonate, ethylene carbonate, dimethyl carbonate, diethyl carbonate, methyl ethyl carbonate, butylene carbonate, vinylene carbonate, 1,2-dimethoxy ethane, 1,2-diethoxy ethane, γ-butyrolactone, tetrahydrofuran, 2-methyl tetrahydrofuran, 1, 3-dioxolane, 4-methyl-1, 3-dioxolane, diethyl ether, sulfolane, methyl sulfolane, acetonitrile, propylnitrile, anisole, acetate, or propionic acid ester, is preferable, and one or more kinds of these solvents are mixed and used.

The secondary battery acts as follows.

In the secondary battery, during charging, the lithium ions is released from the positive electrode 12, and is occluded into the negative electrode 14 via the electrolytic solution 16, for example. During discharging, the lithium ions is released from the negative electrode 14, and is occluded into the positive electrode 12 via the electrolytic solution 16, for example. Since the negative electrode 14 contains the negative electrode material according to the embodiment, the distortion of the crystal structure accompanying the occluding/releasing lithium is eased, with the facility for the electrode reaction, the improvement in the charge and discharge efficiency, and the enhancement in the cycle characteristic as well as in the capacity.

Thus, according to the negative electrode material of the embodiment, since the negative electrode material is composed to contain the compound containing the second element in addition to magnesium and the first element, the occluding/releasing lithium can occur easily. Therefore, the charge and discharge efficiency can be improved, the capacity can be higher, and furthermore, the cycle characteristic can be improved. Thus, the use of the negative electrode material can produce the higher capacity and a secondary battery with the excellent cycle characteristic.

Particularly, when the negative electrode material is composed to contain at least one element selected from the group consisting of manganese, copper, and zinc as the second element, or when the composition ratio of the second element to magnesium ((the second element)/(magnesium)) is set to a range of 0.1/1.9 to 1.9/0.1 inclusive in mol ratio, a more excellent cycle characteristic can be obtained.

Moreover, when the negative electrode material is composed to contain the carbonaceous material in addition to the compound, the excellent properties such as the excellent conductivity and the higher capacity can be obtained.

EXAMPLE

Furthermore, specific examples of the invention will be described in detail.

Compounds $Mg_{2-x}MII_xSi_{1.0}$ containing magnesium, the silicon which is the first element, and the second element MII in Examples 1–6 were produced.

First, the reagents of magnesium, silicon, and the second element were weighed and mixed, the mixture was fused using the high-frequency induction heating equipment, the melt was injected on the rotating copper roll to obtain the compound with ribbon-shape. In Examples 1–6, the kind of the second element was then changed as shown in Table 1, and the mixing ratio of magnesium and the second element was changed so that the mol ratio of the second element to magnesium would be in the range of $x/(2-x)$ as shown in Table 1. In addition, the mixing ratio of silicon was set to $(Mg+MII):Si=2.0:1.0$ in mol ratio. Subsequently, the compound was ground into powder. For the obtained compounds, the compositions thereof were determined by the ICP (Inductively Coupled Plasma). The results are shown in Table 1.

TABLE 1

| | Second element MII | Mol ratio of second element MII to Mg x/(2 · x) | Copmposition of compound |
|---|---|---|---|
| Example 1 | Mn | 0.1/1.9 | $Mg_{1.9}Mn_{0.1}Si_{1.0}$ |
| Example 2 | Mn | 0.5/1.5 | $Mg_{1.5}Mn_{0.5}Si_{1.0}$ |
| Example 3 | Mn | 1.0/1.0 | $Mg_{1.0}Mn_{1.0}Si_{1.0}$ |
| Example 4 | Mn | 1.5/0.5 | $Mg_{0.5}Mn_{1.5}Si_{1.0}$ |
| Example 5 | Cu | 0.5/1.5 | $Mg_{1.5}Cu_{0.5}Si_{1.0}$ |
| Example 6 | Zn | 0.5/1.5 | $Mg_{1.5}Zn_{0.5}Si_{1.0}$ |
| Comparative Example 1 | — | — | $Mg_{2.0}Si_{1.0}$ |

Moreover, the compound $Mg_{2.0}Si_{1.0}$ which does not contain the second element MII was produced in a similar way to the examples as Comparative Example 1 against the examples. For Comparative Example 1, the obtained composition was determined in a similar way to the examples. The result is also shown in Table 1.

Then, the coin type half cells were produced by using the obtained compound of Examples 1–6 or Comparative Example 1 as the negative active material for the negative electrode and by using a lithium-metal foil for the positive electrode, and the properties of the negative electrode were studied. The form of the half cells was the same as that of the secondary battery shown in FIG. 1. And, hereinafter, the explanations will be done with reference to FIG. 1 using the same reference numbers as in FIG. 1.

First, 80% of obtained compound by mass of Examples 1–6 or Comparative Example 1, 10% artificial graphite by mass as the conductive agent and the negative active material, and 10% polyvinylidene fluoride by mass as the binder were combined, dimethylformamide as a solvent was added and mixed, and the mixture was dried to prepare the negative electrode mixture. Then, both the negative electrode mixture of 30 mg and a nickel mesh as the charge collector were shaped into a pellet of 15.5 mm in diameter to prepare the negative electrode 14 for each of examples 1–6 and Comparative Example 1.

Moreover, the electrolytic solution 16 was prepared by dissolving $LiPF_6$ as the lithium salt into a solvent of a 1:1 volume blend of ethylene carbonate and dimethyl carbonate, to have a concentration of 1 mol/$dm^3$. After that, the negative electrode 14 and the separator 15 made of a polypropylene porous film were put on the central part of the exterior cup 13 in order, the electrolytic solution 16 was poured in, the exterior can 11, in which the positive electrode 12 with a pierced lithium-metal foil was put, was applied and caulked to produce the coin type half cell. The size of the half cell was set to 20 mm in diameter and 2.5 mm in thickness.

The charge and discharge examinations were performed on the obtained half cells of Examples 1–6 and Comparative Example 1 to yield of the discharge capacity retentions of the negative electrode 14 in each of the cells. In the examinations, the charge was performed with a constant current of 1 mA until a battery voltage reached 0 V, and then allowing the current to decrease below 30 μA with the cell voltage maintained at 0 V. Moreover, the discharge was performed with a constant current of 1 mA until the cell voltage exceeded 1.5 V. It should be noticed that since the half cell is for evaluating the properties of the negative electrode 14, the process of occluding lithium in the negative electrode 14, i.e., the voltage decrease process in the half cell, is called charging, and conversely, the process of releasing lithium from the negative electrode 14 i.e., the voltage increase process in the half cell, is called discharge.

Figure 2:
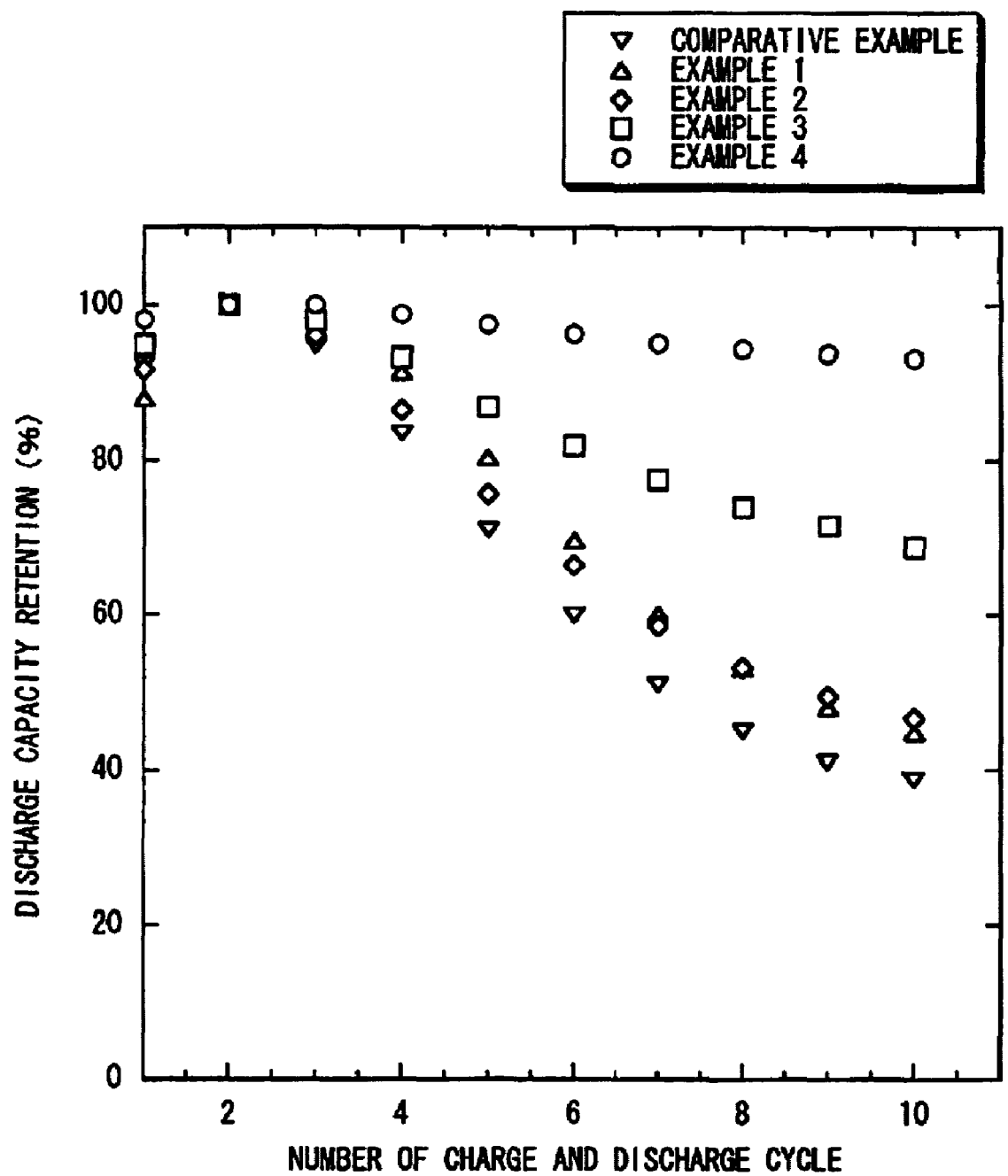
FIG. 2 is a characteristic view showing a relation between the number of the charge and discharge cycle and the discharge capacity retention according to Examples 1–4 of the invention.
Figure 3:
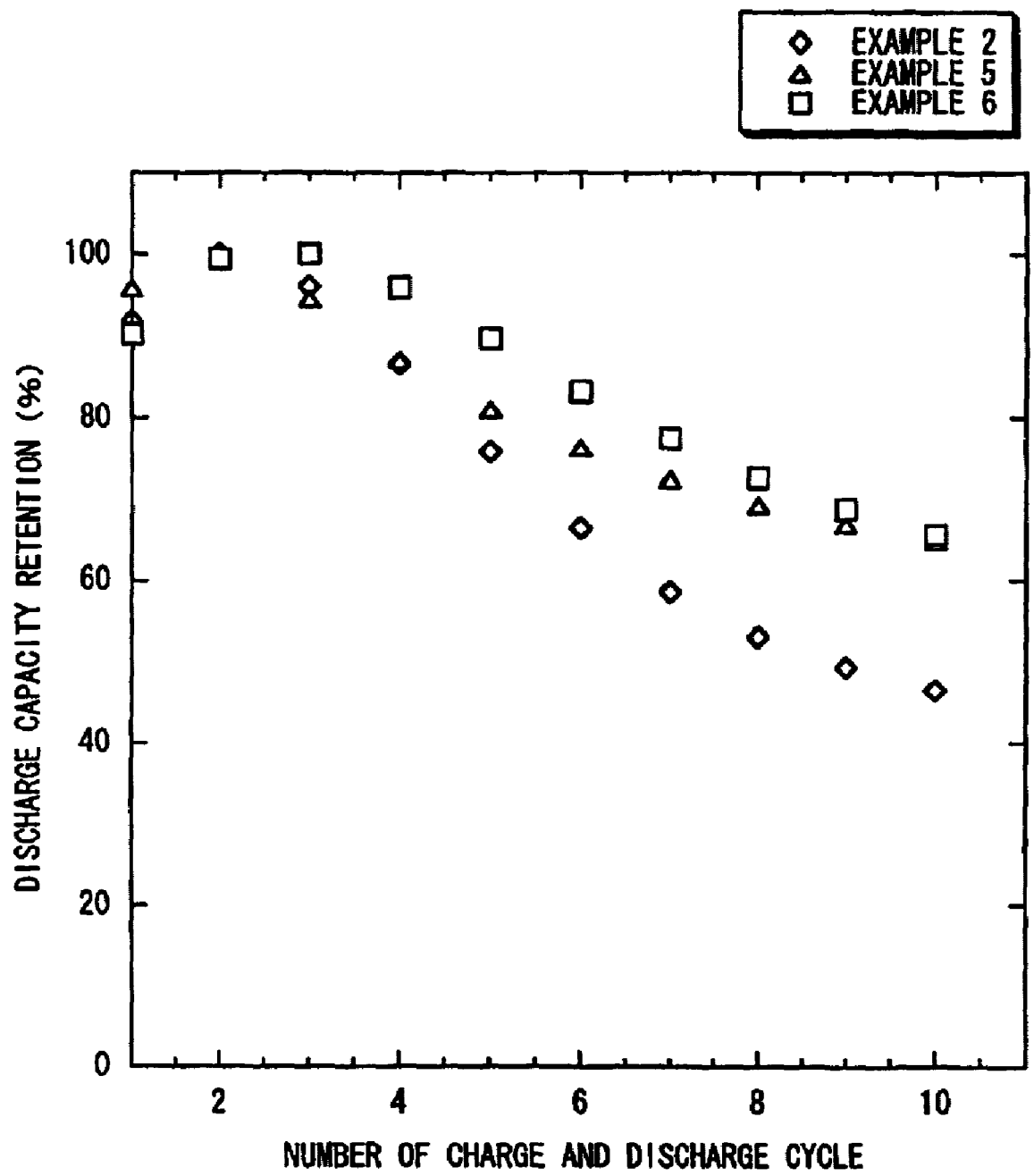
FIG. 3 is a characteristic view showing a relation between the number of the charge and discharge cycle and the discharge capacity retention according to Examples 2, 5, and 6 of the invention.

The discharge capacity retentions were evaluated by calculating the ratio of discharge capacity per cycle to the maximum discharge capacity as reference value, after repeating the charge and discharge 10 times. Capacity per mass was used for expressing the amount of the discharge capacities at that time. The obtained results are shown in FIGS. 2 and 3. FIG. 2 shows the comparison between the results of Examples 1–4 and Comparative Example 1, and FIG. 3 shows the comparison between the results of Examples 2, 5, and 6.

As shown in FIGS. 2 and 3, according to Examples 1–6, the drop in the discharge capacity retention was smaller than that of Comparative Example 1. Moreover, the higher the composition ratio of the second element to manganese, the smaller the drop in the discharge-capacity retention, as shown in FIG. 2. That is, it has been found that when the second element is included along with magnesium and the first element, the cycle characteristic can be improved, and the more contents of the second element are, the more excellent cycle characteristic can be obtained. Furthermore, it has been also found that when manganese, copper, or zinc is included as the second element, the excellent properties can be obtained.

In addition, although the above examples have been described showing the concrete examples as the first element and the second element, uses of another element or two or more elements as the first element or the second element, can produce the same results as the above examples.

Although the invention has been described by the foregoing embodiment and examples, the invention is not limited to the embodiment and the examples but can be variously modified. For example, although the secondary battery using the electrolytic solution obtained by dissolving the lithium salt in the solvent has been described in the above embodiment and the examples, instead of the electrolytic solution, other electrolyte such as a gel-type electrolyte with an lithium-salt containing electrolytic solution hold by a high molecular compound, a solid polymer electrolyte with a lithium salt dispersed in an ion-conductive high molecular compound, an inorganic solid electrolyte made of an inorganic conductor, or the like may be used.

As the above gel-type electrolyte, any various high molecular compounds which absorb and gelate the electrolytic solution, can be used. Such a high molecular compound includes fluorochemical high molecular compounds such as copolymer of polyvinylidene fluoride or vinylidene fluoride and hexafluoro propylene, ether high molecular compounds such as polyethylene oxide and a bridge compound containing polyethylene oxide, and polyacrylonitrile, for example. Especially, the fluorochemical high molecular compounds are preferable because of the high redox stability thereof.

As the high molecular compound of the solid polymer electrolyte, an ether high molecular compound such as polyethylene oxide or a bridge compound containing a polyethylene oxide, an ester high molecular compound such as polymethacrylate, acrylate high molecular compound, any combination thereof, or copolymer where any combination thereof is copolymerized in the molecular, can be used. Moreover, as the inorganic conductor, a polycrystal of lithium nitride, lithium iodide, or lithium hydroxide, a mixture of lithium iodide and dichromium trioxide, or a mixture of lithium iodide, lithium sulfide, and phosphorus sulfide can be used.

Moreover, while in the above embodiment and the examples, the case where lithium is used in the electrode reaction has been described, the invention can also be applied to the utilizations of other alkali metals such as sodium (Na) or potassium (K), alkaline earth metals such as magnesium (Mg) or calcium (Ca), other light metals such as aluminum (Al), lithium, lithium alloys, or any alloys thereof, with the same effects.

Moreover, although the coin type secondary battery has been described in the above embodiment and examples, the invention can be similarly applied to other type of secondary batteries such as a cylindrical type, a button type, a square type, and a film type. In addition, the negative electrode material of the invention is applicable not only to the secondary battery but also similarly to other batteries such as a primary battery.

As described above, according to the negative electrode material of the invention, since the negative electrode material is composed to contain the compound containing the second element in addition to magnesium and the first element, the electrode reaction can easily occur. Therefore, the charge and discharge efficiency can be improved, the capacity can be higher, and furthermore the cycle characteristic can be improved.

Particularly, according to the negative electrode material of the invention, since the second element contains at least one element selected from the group consisting of manganese, copper, and zinc, or since the composition ratio of the second element to magnesium ((the second element)/(magnesium)) is in a range of 0.1/1.9 to 1.9/0.1 inclusive in mol ratio, the more excellent cycle characteristic can be obtained.

Moreover, according to the negative electrode material of the invention, since the negative electrode material further contains the carbonaceous material, the higher properties can be obtained.

Furthermore, according to the battery of the invention, since the negative electrode material of the invention is used, the high capacity and the excellent cycle characteristic can be obtained.

Obviously many modifications and variations of the present invention are possible in the light of the above teachings. It is therefore to be understood that within the scope of the appended claims the invention may be practiced otherwise than as specifically described.

What is claimed is:

1. A negative electrode for a battery comprising a compound, the compound consisting essentially of:
   (a) magnesium (Mg),
   (b) a first element of at least one element selected from the group consisting of silicon (Si), tin (Sn), germanium (Ge), and lead (Pb), and
   (c) a second element of at least one element selected from the group consisting of manganese (Mn), copper (Cu), and zinc (Zn),
   wherein,
   the ratio $(Mg+M_2):M_1$ is equal to 2:1, wherein Mg is the moles of magnesium, $M_2$ is the moles of the second element, and $M_1$ is the moles of the first element, and
   the negative electrode further comprises a carbonaceous material.

2. A negative electrode according to claim 1, wherein the composition ratio of the second element to magnesium ((the second element)/magnesium)) is in a range of 0.1/1.9 to 1.9/0.1 inclusive in mol ratio.

3. A negative electrode according to claim 2, wherein the carbonaceous material contains at least one element selected from the group consisting of a non-graphitizing carbon material, a graphitizing carbon material, and graphite.

4. A battery comprising an electrolyte with a positive electrode and a negative electrode,
   wherein
   the negative electrode contains a compound, the compound consisting essentially of magnesium (Mg), a first element of at least one element selected from the group consisting of silicon (Si), tin (Sn), germanium (Ge), and lead (Pb), and a second element of at least one element selected from the group consisting of manganese (Mn), copper (Cu), and zinc (Zn),
   a ratio $(Mg+M_2):M_1$ is equal to 2:1, Mg being the moles of magnesium, $M_2$ being the moles of the second element, and $M_1$ being the moles of the first element, and
   the negative electrode further comprises a carbonaceous material.

5. A battery according to claim 4, wherein the composition of the second element to magnesium ((the second element)/(magnesium)) is in a range of 0.1/1.9 to 1.9/0.1 inclusive in mole ratio.

6. A battery according to claim 4, wherein the carbonaceous material contains at least one element selected from the group consisting of a non-graphitizing carbon material, a graphitizing carbon material, and graphite.

* * * * *